March 26, 1940.   C. S. LAWTON   2,194,947
METHOD AND APPARATUS FOR DETERMINING TOPOGRAPHY OF OCEAN BED
Filed July 23, 1937   6 Sheets-Sheet 1
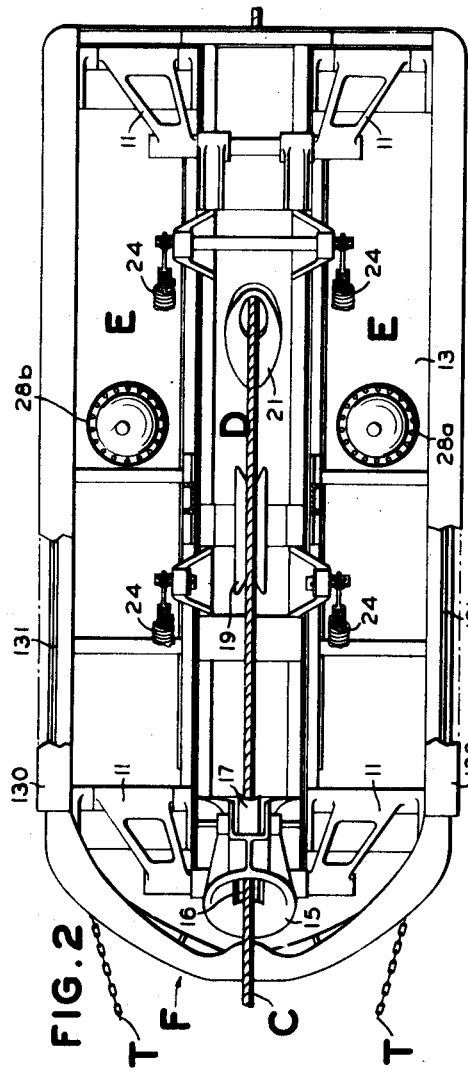
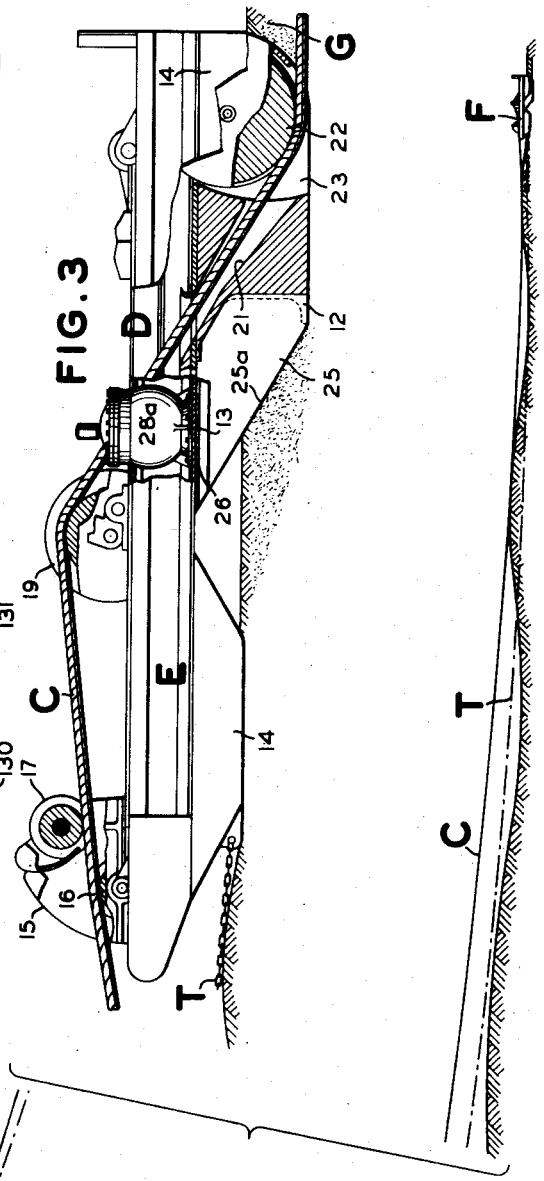
INVENTOR
C. S. LAWTON
ATTORNEY

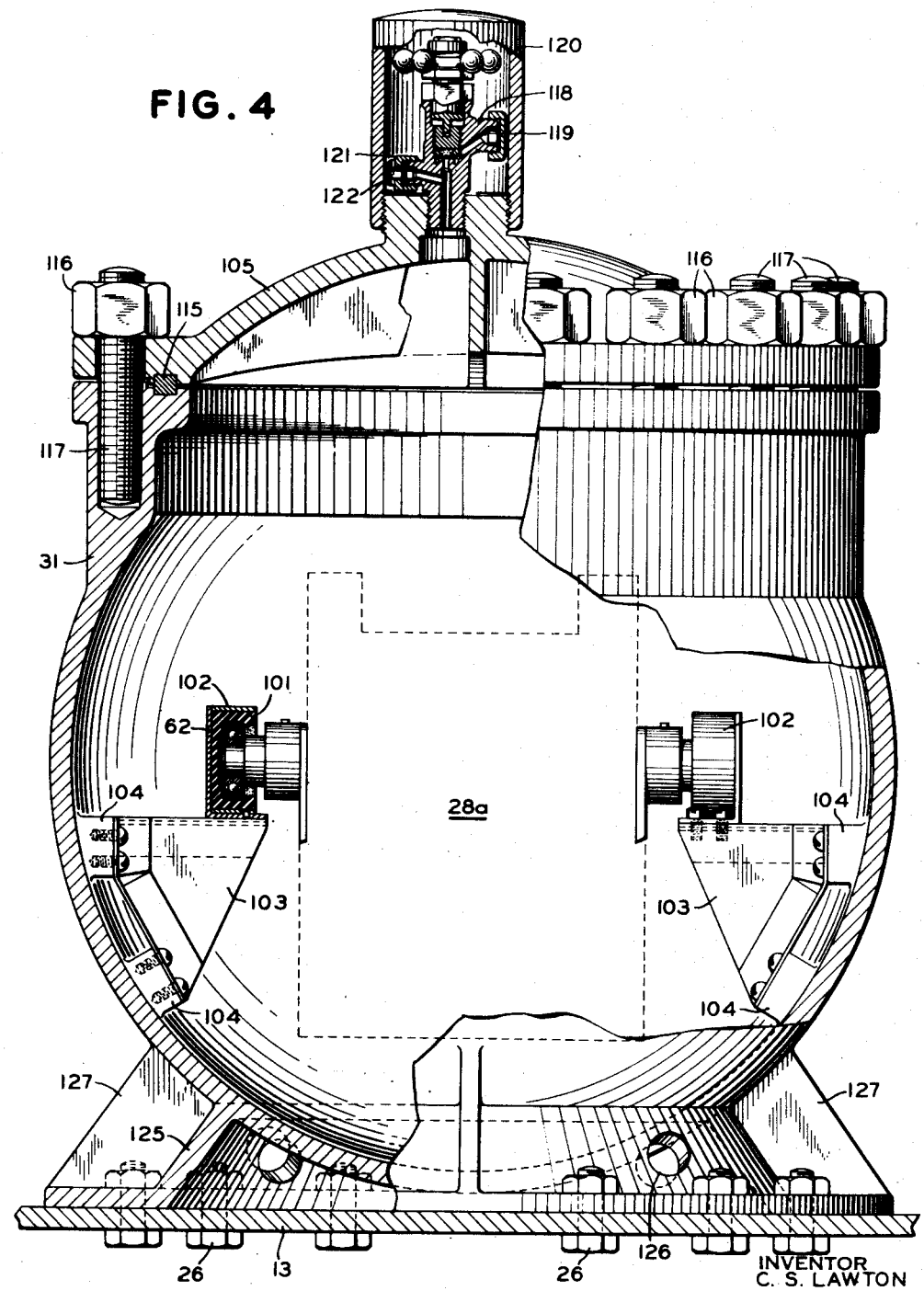

March 26, 1940. C. S. LAWTON 2,194,947
METHOD AND APPARATUS FOR DETERMINING TOPOGRAPHY OF OCEAN BED
Filed July 23, 1937 6 Sheets-Sheet 3

INVENTOR
C. S. LAWTON
BY Marvin J Reynold
ATTORNEY

March 26, 1940. C. S. LAWTON 2,194,947
METHOD AND APPARATUS FOR DETERMINING TOPOGRAPHY OF OCEAN BED
Filed July 23, 1937 6 Sheets-Sheet 4

INVENTOR
C. S. LAWTON

BY
*Marvin J. Reynolds*
ATTORNEY

March 26, 1940. C. S. LAWTON 2,194,947

METHOD AND APPARATUS FOR DETERMINING TOPOGRAPHY OF OCEAN BED

Filed July 23, 1937 6 Sheets-Sheet 5

INVENTOR
C. S. LAWTON

BY *Marvin J Reynolds*
ATTORNEY

March 26, 1940.  C. S. LAWTON  2,194,947

METHOD AND APPARATUS FOR DETERMINING TOPOGRAPHY OF OCEAN BED

Filed July 23, 1937  6 Sheets—Sheet 6

INVENTOR
C. S. LAWTON
BY *M. J. Reynolds*
ATTORNEY

Patented Mar. 26, 1940

2,194,947

UNITED STATES PATENT OFFICE 2,194,947

METHOD AND APPARATUS FOR DETERMINING TOPOGRAPHY OF OCEAN BED

Chester S. Lawton, Ridgewood, N. J., assignor to The Western Union Telegraph Company, New York, N. Y., a corporation of New York Application July 23, 1937, Serial No. 155,187

21 Claims. (Cl. 61—72)

This invention relates generally to a method of and apparatus for determining the topography of the bed of the ocean or other body of water, and more particularly to determining the successive positions assumed by a submarine cable laying device during cable laying operations.

Submarine cables when laid on the bed of the ocean or other body of water through which they pass, are frequently fouled or dragged and sometimes are broken by otterboards of nets of fishing vessels or by ships' anchors, and in the U. S. patent to Lawton and Bloomer, No. 2,067,717, issued January 12, 1937, and in the U. S. patent of C. S. Lawton, Reissue No. 20,665, granted March 1, 1938, there are disclosed various forms of a submarine cable plow for forming under water a trench in the bed of the body of water in which the cable is to lie and simultaneously placing the cable therein to embed the same and thus avoid fouling of, or injury to, the cable. It is highly desirable to ascertain the successive angular positions assumed by the cable plow axes (transverse and longitudinal) during the plowing operation, thereby to disclose the configuration or topography of the bed in which the cable is laid and the rise and fall of the embedded cable due to elevations and depressions in the ocean bed.

One of the objects of the invention is to provide apparatus, suitable for use in water of varying depth, which will disclose the successive positions of cable embedding devices during the embedding operation.

Another object is apparatus of the foregoing character which is adapted to be secured to and carried by the cable embedding device, and which will operate equally well in shallow and deep water.

A further object is novel and improved apparatus for determining the topography of the bed of the ocean or other body of water.

The invention further resides in the features of combination, construction and arrangement hereinafter described and claimed.

For an understanding of the invention, and for illustration of one of the various forms it may take, reference is had to the accompanying drawings, in which:

Fig. 1 is a diagrammatic view of a cable ship and a submarine cable plow embodying recording apparatus in accordance with the invention, during cable laying operations;

Fig. 2 is a plan view of the submarine cable plow and recording apparatus;

Fig. 3 is a side view, in elevation, of the apparatus of Fig. 2, with certain parts broken away;

Fig. 4 is a side view, in elevation, of one of the recording devices in its casing, with certain parts broken away;

Figure 5:
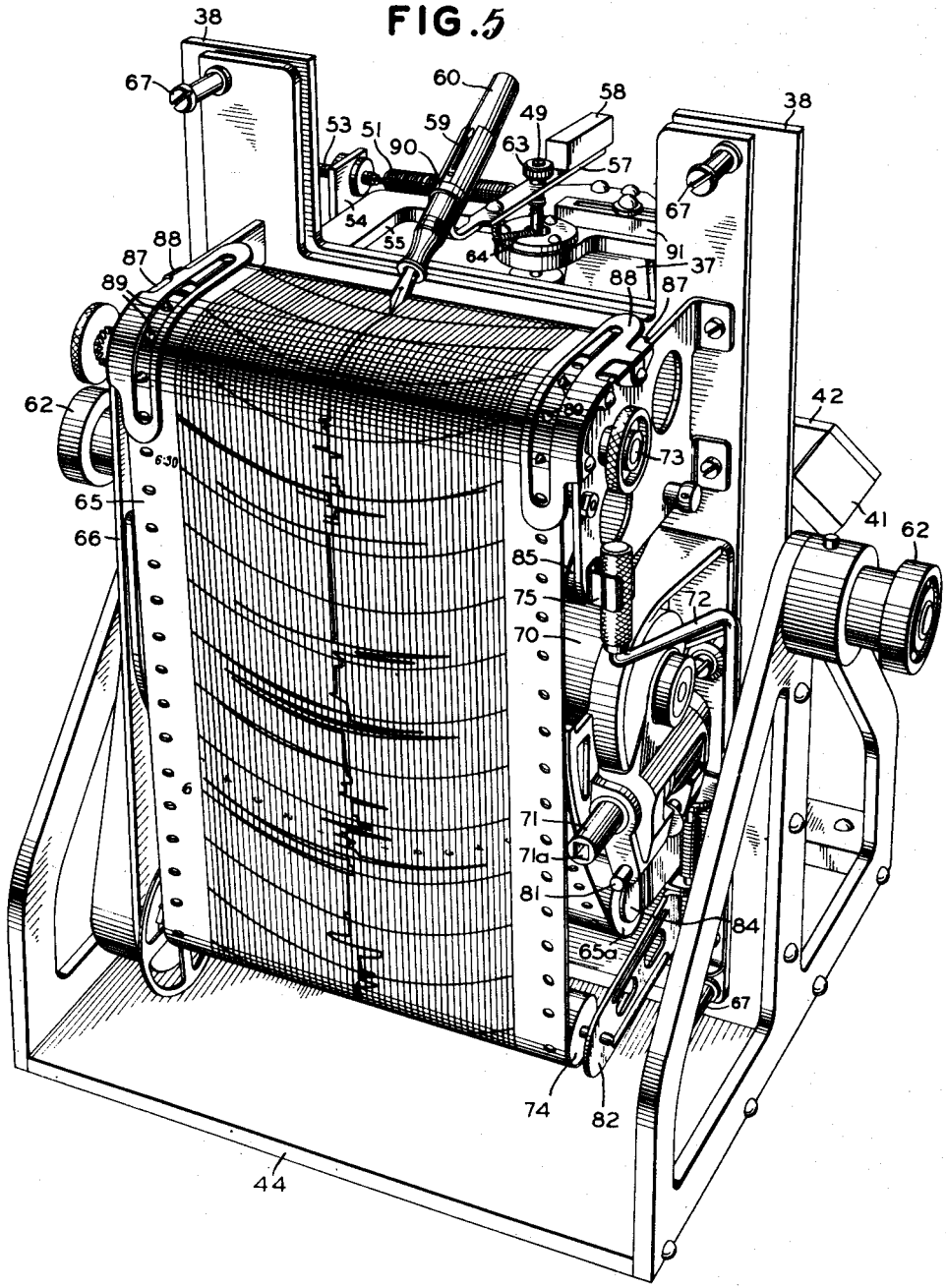
Fig. 5 is a perspective view of one of the recording devices removed from its casing.

Referring to Figs. 1 to 3 of the drawings, there is shown a cable embedding device F for forming a cable trench in the bed of the body of water in which the cable C is to lie and simultaneously placing the cable in the trench. As will be seen from Fig. 1, the cable embedding device is towed by a cable ship or vessel V, by means of a towline T, both the cable and towline forming long curves in the water. By employing a towline of proper length, the sag in the line causes the latter to exert a pull on the cable embedding device in a direction substantially parallel to the bed on which the embedding device is traveling. Preferably, the sag in the cable is maintained such that the cable is approximately tangent to the bed at or near the point where it enters the embedding device. The cable is payed out from a cable supply in the hold of the vessel V, the cable passing through suitable dynamometer and brake devices on board the cable ship.

The cable embedding device may be of the type disclosed in the aforesaid Lawton and Bloomer Patent No. 2,067,717, but preferably is in accordance with the improved form of cable plow disclosed in the aforesaid patent of C. S. Lawton, Reissue No. 20,665, granted March 1, 1938. Briefly, the latter device comprises two frame members or platforms, generally indicated at D and E, respectively, operatively connected together by forward and after link arms 11, which coact to cause the plowshare 12, Fig. 3, to form a cable trench that varies in depth as the ground resistance of the bed varies, thereby to maintain the towline tension within predetermined limits and to cause the cable to be embedded to a greater depth in those areas of the ocean bed comprising soft material than in the areas comprising denser material. Secured to the plate 13 of the frame member E are runners or skids 14 by means of which the cable embedding device is slid along on the bottom of the ocean.

Mounted on the frame D is a cable guide member 15 which permits the cable C easily to enter the guide and pass between the sheaves or rollers 16 and 17, over a roller 18, and through a trunkway 21, Fig. 3, the cable being forcibly laid in the bottom of the trench G by means of a sheave or cable guide roller 22, the cable passing between two side plates 23 in order that the material displaced by the plow will not slide or be washed back into the trench before the cable is laid therein. As set forth in detail in the aforesaid Lawton reissue patent, the platform D in its lowermost position rests on the platform E, and retractile tension springs 24, operatively connected to the platforms, are provided to oppose their separation. The plowshare 12 is rigidly secured to and depends from the platform D which is vertically movable with respect to platform E. When the ground resistance offered to the passage of the plowshare 12 builds up, a couple is created with the towing tension, tending to separate the two platforms D and E vertically. This causes the upper platform D to rise to different heights depending upon the density of the material forming the bed, and this causes a corresponding rise in the plowshare 12 carried by the platform D, thus decreasing the depth of the trench G as the dense material is encountered and causing the trench to vary in depth inversely as the density of the material forming the surface of the bed of the body of water. Resisting the couple thus formed is the weight of the upper platform D and the tension exerted by the springs 24, and by proper design of the spring structure a balance can be obtained at any predetermined maximum towing tension at both extreme positions of the frames.

In order to prevent fouling of the plowshare 12 by obstructions, such as underlying rock formations and the like, which may be encountered in the ocean bed, a web portion 25 is provided which extends between the plowshare and the platform D, the inclined forward portion 25a of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered.

Secured in any suitable manner, as by bolts 26, to the plate 13 of the platform E are two recording devices 28a and 28b, Figs. 2 and 3, constructed in accordance with the present invention, these two devices coacting to produce a record of the successive positions of the cable plow axes (transverse and longitudinal) with respect to the horizontal, i. e., the angular positions of the embedding device, during the entire plowing operation.

Figs. 4 to 8 illustrate the various details of a preferred form of this device. As shown in Fig. 4, the devices 28a and 28b are each mounted, in a manner hereinafter described, within a waterproof casing 31 which is generally spherical in form thereby to enable the same to better resist the enormous pressure exerted thereon when operating in deep water. Figs. 5 to 8 show the recorder removed from its casing. The recorder comprises a pendulum 33, Figs. 6 to 8, capable of swinging in one plane only, the pendulum being suspended from a freely rotatable shaft 34 mounted in bearings 35 and 36, Fig. 6, in the frame members 37 and 38, respectively. The arc through which the pendulum may swing is limited by two stop members 41 secured to an arm 42 carried by the upright frame member 37 which is rigidly secured to the base 44. The shaft 34, from which the pendulum depends, has fastened thereto one end of a cord 46, and two or more turns of the cord are wound around the shaft 34 when the pendulum is in its midpoint position, as shown in the drawings. The cord 46 extends around an idler roller 47 and thence to a roller 48 to which the other end of the cord is fastened, so that any turning movement of the shaft 34, caused by a movement of the pendulum, will cause a corresponding movement of the roller 48 and the vertical rotatable shaft 49 to which the roller 48 is keyed or otherwise secured.

Figure 7:
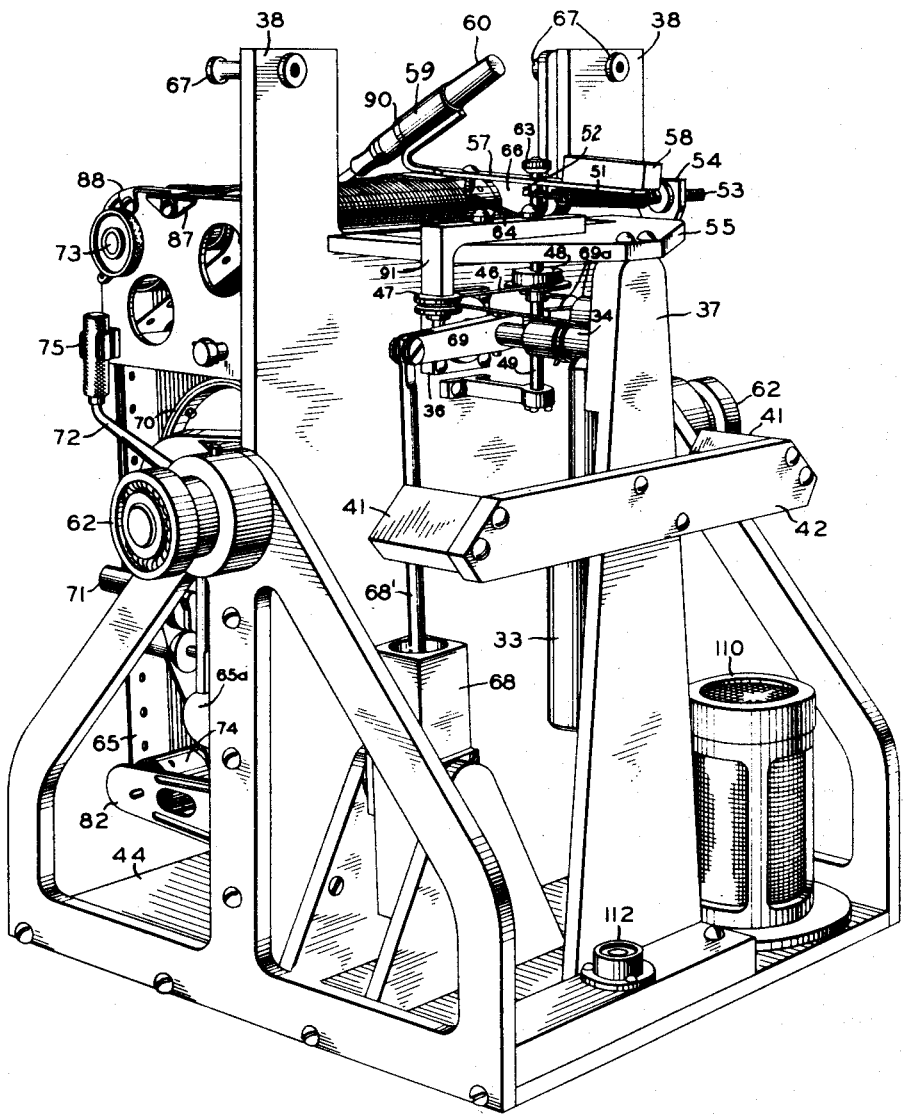
Fig. 7 is a rear view of the device.

The upper end of the shaft 49 is biased by a contractile spring 51, Fig. 7, which is held under tension by a cord 52 having one end thereof secured to the shaft 49, with several turns of the cord around the shaft, tending to cause rotation of the shaft in a counter-clockwise direction as viewed in the figure. The other end of the spring 51 is anchored by means of a threaded rod 53 which passes through a lug 54 secured to the plate member 55. When the shaft 34 is turned by movement of the pendulum in a direction to unwind that portion of the cord 46 around the shaft 34, as the cord unwinds it is kept taut by the contractile action of the spring 51 and the cord 52, and the movement of the cord 46 is such as to cause the shaft 49 to turn, in a counter-clockwise direction, as viewed in Fig. 7, through an angle proportional to the turning movement of the shaft 34. When the shaft 34 is turned by movement of the pendulum in a direction to wind the cord 46 on the shaft, this causes a corresponding turning movement of the shaft 49, in a clockwise direction as viewed in Fig. 7, the spring 51 expanding as the turning movement progresses. Thus, any turning movement of the pendulum, with consequent turning movement of the shaft 34, in either direction, causes a corresponding turning movement of the shaft 49.

Mounted on the upper end of the shaft 49, and rotatable therewith, is an arm 57 having at one end thereof a counterweight 58 and at the other end a spring clasp 59 for holding a recording pen 60, which pen records the relative angular motion of the pendulum with respect to the axis of the recorder through the recorder main bearings 62. Preferably, the pen arm 57 has a pin which engages a slot in the vertical shaft 49, thereby to permit limited rocking movement of the pen arm in a vertical plane while at the same time causing the pen arm to turn with the shaft 49 so that any turning movement of the shaft causes a corresponding lateral marking movement of the pen 60. A knurled thumb nut 63 permits ready removal of the arm 57 and pen 60 carried thereby. A spring 64 causes the pen to lightly bear on a chart 65 of a clock mechanism 66, Figs. 5 and 6, removably secured by screws 67 to the plate 38 of the pendulum assembly. The clock mechanism may be any of the various known types suitable for causing longitudinal movement of the chart 65 at a measured rate of speed relative to the pen 60.

Figure 6:
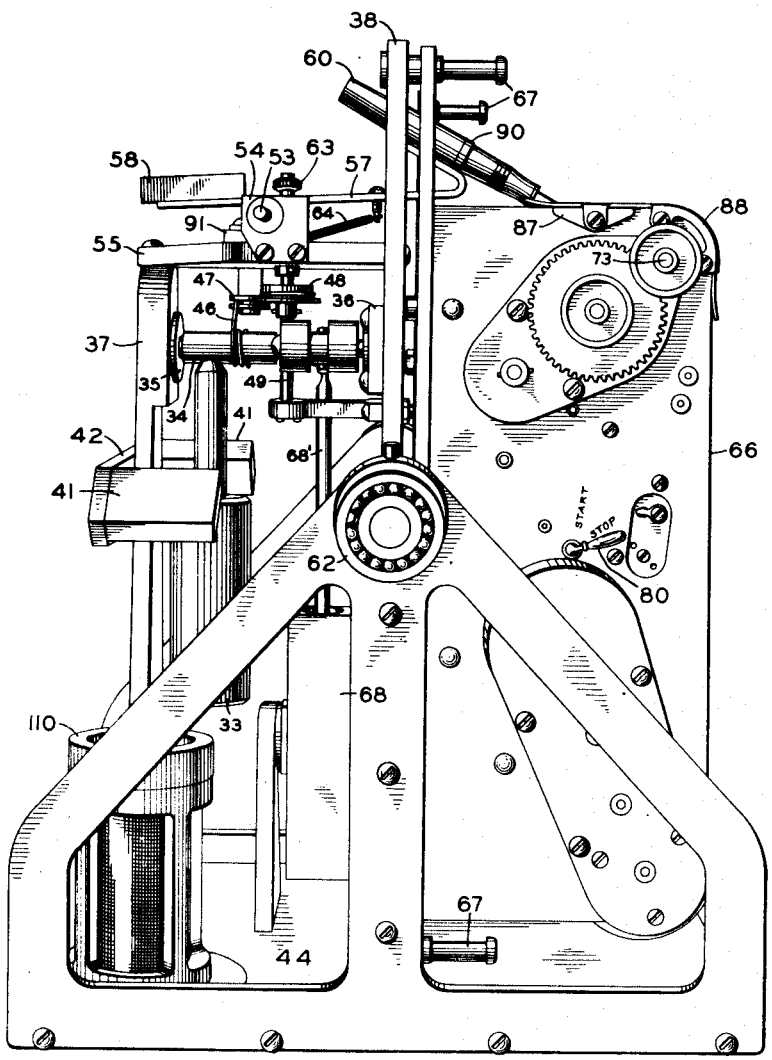
Fig. 6 is a side view of the device of Fig. 5.
Figure 8:
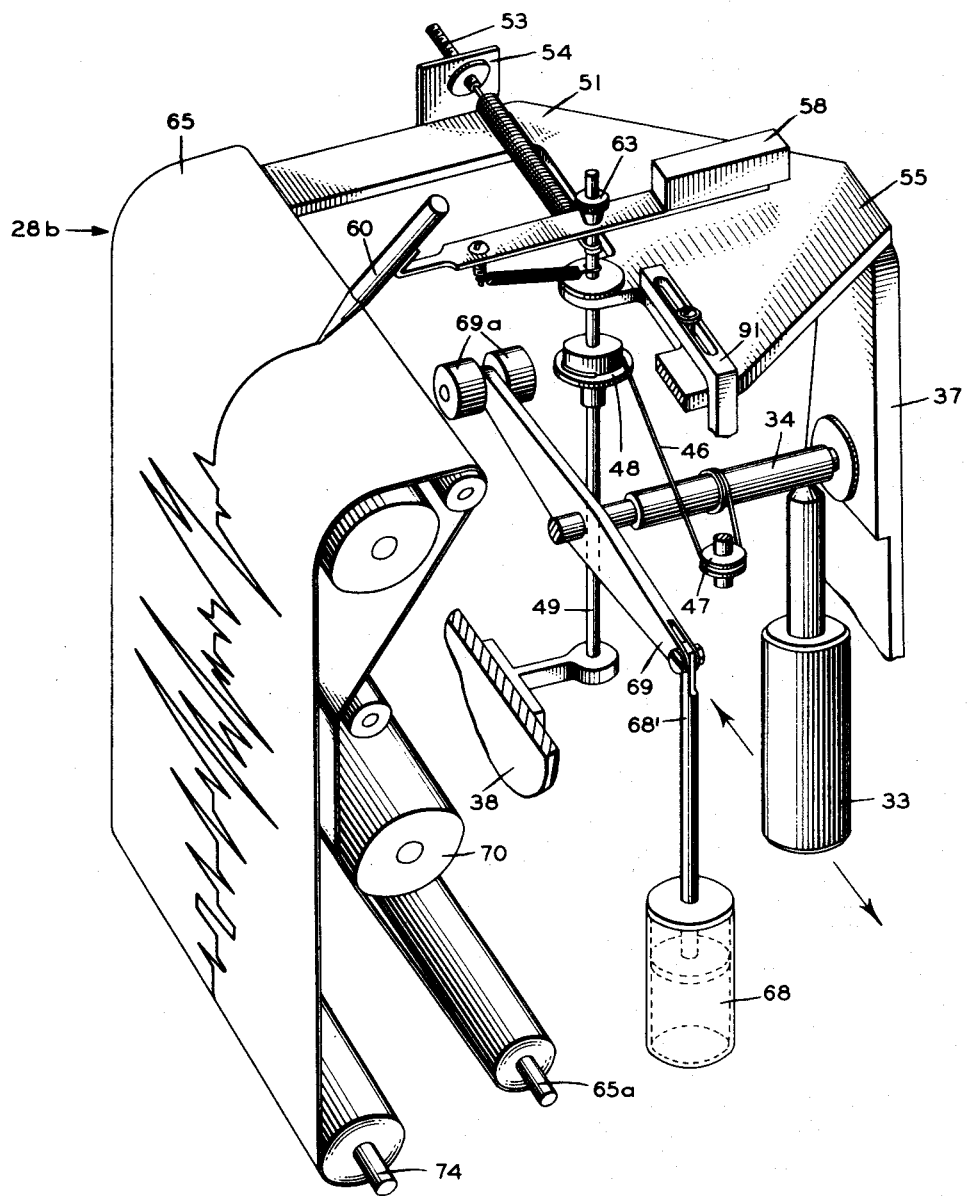
Fig. 8 is a diagrammatic view of the device.

A dashpot arrangement, Figs. 6 to 8, comprising a piston cylinder 68 and a cooperating piston connected by a piston rod 68' and lever 69 to a reduced portion of the shaft 34, eliminates sharp jerks on the pendulum and pen actuating mechanism. Counterweights 69a on the lever 69 are provided to insure smooth action of the dashpot apparatus.

Figs. 5 and 6 show certain details of the chart and clock mechanism. Briefly, the clock, which is of a type well known in the art, comprises driving spring mechanism, enclosed in a housing 70, having a winding shaft 71 therefor with a socket 71a in the end thereof adapted to receive the square end of a crank 72 for winding or unwinding the springs which drive the clock mechanism, the chart feed roller 73 and the chart spool 74. When not in use the crank 72 may conveniently be held by a spring clip 75 secured to the clock framework.

The chart and clock mechanism will be understood from the following description of the manner in which the device is prepared for determining and recording the successive angular positions of the cable embedding device during the embedding operation. With the clock start-stop lever 80, Fig. 6, in "stop" position, remove the winding crank 72 from its clip 75, Fig. 5, and place the squared end of the crank in the socket 71a; also, depress the detent lever 81 which is just below the socket. It will be necessary to turn the crank clockwise, as viewed in the figure, and take a strain against the spring mechanism before the associated detent may be depressed. When the detent releases the spring mechanism, unwind the same until all tension is removed. Next, throw the clock start-stop lever 80 to "start" position, holding onto the chart spool 74 and releasing the same slowly to permit the chart spool spring in housing 70 to unwind. The purpose of this procedure is to wind both the clock and chart spool springs equally. Wind the clock after again moving the start-stop lever to "stop" position. After the clock is wound, do not operate the start-stop lever until the chart 65 is in place, otherwise the chart spool 74 will unwind. For this reason it is not advisable to permit the chart to run out or to remove the chart when the clock is running.

To place the chart in the recorder, press the right hand chart spool bearing 82 to the right and remove the chart spool. Place the chart roll 65a in position on the chart roll bearings 84, the chart feeding forward from the top of the roll. Bring the end of the chart forward and thread back between the cross bar 85 and the upper chart feed roller 73, and bring forward again above the recording plate 87 and under guides 88, meshing the chart holes with the pins 89 in the feed roller 73. Next, pull the end of the chart downward, rolling four or five turns of the chart on the spool 74 and slip the spool in place.

After the chart is in place, attach the pen 60 to the pen arm 57 by pushing the pen into the clip 59 until the stop ring 90 engages the clip. Now place the pen arm on the vertical shaft 49 by removing the thumb nut 63 and placing the pin of the pen arm in the slot on the vertical shaft, replacing the thumb nut. See that the pen hold-down spring 64 is attached to both the pen arm and shaft. This operation can be accomplished without removing the spring 64 from either pen arm or shaft.

Moving the pendulum 33 by hand should now cause the pen to record on the chart, and by moving the pendulum from one stop 41 to the other, the record may be centered on the chart by adjusting the position of the L-shaped arm 91, Figs. 6 and 7, which carries the idler roller 47.

Preferably, the ink used in the recording pen 60 is a solution comprising 400 parts of water, 96 parts glycerine, and 35 parts triethylene glycol, by volume, with methyl violet dye dissolved therein until the desired depth of color is obtained, although other inks suitable for the purpose may be used.

Rubber bearing caps 101, Fig. 4, are placed over the main recorder bearings 62 and detachable cups 102 placed over the rubber caps. The recorder is now placed in its casing 31 and the cups 102 fastened, as by screws, to the supporting brackets 103 secured by lugs 104 to the wall of the casing. The center of gravity of the recorder is below its axis through the bearings 62, and because of the foregoing manner in which the recorder is suspended in its casing the recorder will not turn about its axis, notwithstanding any movement of the casing 31 about the recorder axis, and the axis of rotation of the shaft 34, from which the pendulum is suspended, remains horizontal. Therefore, the pendulum 33 remains, and swings at all times, in a vertical plane, and thus the movements of the pendulum under the influence of gravity accurately indicate the departure of the cable embedding device, upwardly and downwardly, from the horizontal. One of the recorders secured to the platform E, Fig. 2, for example, recorder 28a, is disposed so that the vertical plane in which its pendulum swings is substantially parallel to the longitudinal axis of the embedding device F, and thus the pen 60, Fig. 5, records on the chart 65 the successive positions of the device F, with reference to its longitudinal axis, during the cable embedding operation. The other recorder 28b, secured to the platform E, and which is like the recorder 28a, is turned ninety degrees with respect to the device 28a, so that the vertical plane in which the pendulum of device 28b swings is substantially parallel to the transverse axis of the embedding device, and thus its recording pen records on a chart the successive positions of the device F, with respect to its transverse axis, during the cable embedding operation. The records thus obtained disclose the configuration or topography of the bed in which the cable is embedded and also the rise and fall of the embedded cable due to elevations and depressions in the ocean bed.

In the device illustrated for determining the successive positions of a submarine cable embedding device, the chart travel is one foot per hour, the chart containing sufficient paper for approximately ninety hours of operation, although this is usually a longer time than required. The position of the pen, Fig. 5, on the chart should be timed when the clock is started, and figures, such as those shown on the left hand margin of the chart, denote time intervals. The pendulum 33 is designed to swing fifty degrees on either side of midposition, consequently the longitudinal lines on the particular chart shown, indicate ten, twenty, thirty, etc., degrees from center, very approximately, the approximation being due mainly to the fact that these divisions are equal, while the sines of the pendulum angle with the vertical are proportionately greater for small angles.

A container 110, Figs. 6 and 7, secured to the base 44 of the pendulum assembly, is provided to hold silica-gel or other suitable substance for absorbing any water or moisture present in, or which may enter, the container 31, Fig. 4. The silica-gel used is white in color but changes to a light brown as water is absorbed. The silica-gel container 110 is designed to hold enough gel to remove 97% of the water from a volume of air equal to five times the cubic content of the container 31, when said air is at 70° F. and 100% humidity. However, condensation on the inner wall of the casing 31 should be wiped off before installing the recorder in the casing, and a fresh supply of gel should be used each time the recorder is placed in service. Gel removed from the container should be saved since it may be returned to its original condition by heating to 400° F. for three hours, then to 500° F. for one hour, after which it should be placed in an airtight container until needed.

A spirit level 112, Fig. 7, secured to the base 44, provides a means of determining whether the recorder is level. It will be understood that there is sufficient clearance between the recording device and the casing 31 so that the recorder will remain suspended from its axis, through the bearings 62, irrespective of movement of the casing 31 about the recorder axis.

When the recorder is to be placed in service, it should be carefully checked to determine whether the instrument is equipped with silica to absorb moisture, chart in order, pen supplied with ink and running freely, and the clock wound. The container 31, Fig. 4, cover 105 and gasket 115 should be clean and dry. Then, assuming the recording instrument has been properly mounted in the bearing cups 102 and the latter secured to the supporting brackets 103, be sure that the clock is running and that the chart has been marked on the margin correctly for time. Swing the recording instrument through one complete revolution to check clearance. Lower the casing cover 102 into place over the gasket 115, and set up the nuts 116 evenly to refusal on the studs 117 and tighten with a socket wrench.

In order to prevent the entrance of water into the container 31 when the recording apparatus is lowered in the ocean or other body of water, and to counteract the very considerable pressure encountered in deep water, the container is filled with a gaseous medium, such as nitrogen, introduced under pressure. To accomplish this, remove the valve caps 119 and 120 of the valve 118 on the casing cover 102 and couple an air line to the valve. Attach the air line to a regulator on a nitrogen bottle, the structure and operation of which are well known in the art and for this reason are not here described in detail. Back off the regulator control valve on the nitrogen bottle and open the valve 118 on the cover of the casing. Then open the valve 118 on the nitrogen bottle, admitting nitrogen to the regulator, and screw in on the regulator valve until hissing is heard in the air line. Continue admitting nitrogen slowly to the casing 31 until the pressure stands at approximately 200 pounds per square inch. Back off the regulator valve and close the valve on the nitrogen bottle. Apply soap suds around the joint between the cover 102 and the casing 31 and watch for leaks. Also, check around the threads of the valve 118. If tight, and the pressure remains steady at 200 pounds, close the valve 118, remove the air line, and test the inlet of valve 118 for leakage with soap suds. If tight, screw on the caps 119 and 120 to protect the valve from damage. The pressure on the casing 31 is left on, since this lowers the pressure differential to be withstood when the container is in deep water, and if released the pen will not function. Preferably, and as shown, the valve 118 has a safety disc 121 which will break at approximately 2600–2800 pounds per square inch, and relieve excess pressure through an opening 122 to the outside.

Each recording device 28a and 28b is then secured, as by the bolts 26, to the plate 13 of the platform E. As shown in Fig. 4, the circular base 125 of the container 31 is provided with openings 126 to equalize the pressure within and without the circular base, the base also being provided with reinforcing ribs 127. As above stated, one of the units 28a is disposed so as to record the longitudinal deflections of the embedding device, with respect to the horizontal, and the other device 28b is disposed so as to record the transverse deflections, with respect to the horizontal.

The device F may be lowered onto the bed of the ocean or other body of water by any suitable form of lowering line, such as shown in the aforesaid Patent No. 2,067,717 or the Lawton reissue Patent No. 20,665. Because of the disposition of the center of gravity which is kept low in the device F, and because of the substantial breadth of the device and the side plate members 130 and 131, the device will not turn over even though canted through a large angle with respect to the horizontal, and if the embedding device should be canted onto its side, its configuration and its low center of gravity will tend to cause it to return to working position. The device is especially adapted for embedding a submarine cable and simultaneously determining the topography of the bed in which the cable is embedded, in deep water and at considerable distances from shore, and may be lowered into working position out at sea in such areas. The various mechanical elements of the apparatus disclosed may be made from iron, steel, brass or other suitable material, preferably material resistant to the corrosive action of salt water.

In the specific embodiment illustrated, the device F, on which the units 28a and 28b are mounted, is employed for embedding a submarine cable, but the invention is not limited to such a device since the recording apparatus disclosed can be used equally well with other devices which may be slid or otherwise caused to travel along on the bed of the ocean or other body of water for determining and recording the topography of the bed. Such a device may be used to determine the most desirable route for a cable to take, and may be employed for obtaining accurate charts of the topography of the bed in harbors and other places, and to locate uncharted sand bars.

Many other and varied forms and uses will readily suggest themselves to those versed in the art without departing from the invention, and the invention is, therefore, not limited except as indicated by the scope of the appended claims.

What I claim is:

1. A method of determining the topography of the bed of the ocean or other body of water, which comprises causing a device to travel along under water on said bed and follow the configuration thereof, and ascertaining the successive positions assumed by the device with respect to the horizontal as it travels along on said bed.

2. A method of determining the topography of the bed of the ocean or other body of water, which comprises causing a device to travel along under water on said bed and assume successive angular positions corresponding to the configuration of the bed, and ascertaining the successive angular positions assumed by the device as it travels along on said bed.

3. A method of determining the topography of the bed of the ocean or other body of water, which comprises causing a device to travel along under water on said bed in such manner that an axis of the device assumes successive angular positions corresponding to the configuration of the bed, and ascertaining the successive angular positions assumed by said axis as the device travels along on said bed.

4. A method of determining the topography of the bed of the ocean or other body of water, which comprises causing a device to travel along under water on said bed in such manner that the longitudinal and transverse axes of the device each assume successive angular positions corresponding to the configuration of the bed, and ascertaining the successive angular positions assumed by said axes as the device travels along on said bed.

5. In the art of laying a submarine cable by passing the cable through a cable laying device which travels along under water on the bed of the body of water in which the cable is to lie, the method of determining the configuration of said bed which comprises ascertaining the successive angular positions assumed by said cable laying device as it travels along on the bed during the cable laying operation.

6. In the art of laying a submarine cable by passing the cable through a cable laying device which travels along under water on the bed of the body of water in which the cable is to lie, the method of determining the successive positions of the cable laying device during the cable laying operation which comprises causing an axis of said device to assume successive angular positions corresponding to the configuration of said bed, and ascertaining the successive angular positions assumed by said axis as the cable laying device travels along on said bed.

7. Apparatus for determining the topography of the bed of the ocean or other body of water, comprising a device and means for causing the device to travel along under water on the bed of said body of water, and means operable under the water for indicating the successive positions of the device as it travels along on said bed to disclose the topography of the bed, said last named means being a self-contained unit secured to said device and having apparatus therein operable under the influence of gravity for indicating said angular positions, said unit including a casing which completely encloses and seals said apparatus to prevent entrance of water to the apparatus and having means for counteracting the hydrostatic pressures encountered in the body of water in which the device is working.

8. Apparatus for determining the topography of the bed of the ocean or other body of water, comprising a device and means for causing the device to travel along under water on the bed of said body of water and assume successive angular positons corresponding to the configuration of the bed, and means operable under the water for indicating the successive angular positions assumed by the device as it travels along on said bed, said last named means being a self-contained unit secured to said device and having apparatus therein operable under the influence of gravity for indicating said angular positions, said unit including a casing which completely encloses and seals said apparatus to prevent entrance of water to the apparatus and having means for counteracting the hydrostatic pressures encountered in the body of water in which the device is working.

9. Apparatus for determining the topography of the bed of the ocean or other body of water, comprising a device and means for causing the device to travel along under water on the bed of said body of water in such manner that an axis of the device assumes successive angular positions corresponding to the configuration of the bed, and means operable under the water for indicating the successive angular positions assumed by said axis as the device travels along on said bed, said last named means being a self-contained unit secured to said device and having apparatus therein operable under the influence of gravity for indicating said angular positions, said unit including a casing which completely encloses and seals said apparatus to prevent entrance of water to the apparatus and having means for counteracting the hydrostatic pressures encountered in the body of water in which the device is working.

10. Apparatus for determining the topography of the bed of the ocean or other body of water, comprising a device and means for causing the device to travel along under water on the bed of said body of water, and means on said device operable under the water for indicating the sucsive positions of the device as it travels along on said bed, said last named means being a self-contained unit secured to said device and having apparatus therein operable under the influence of gravity for indicating said angular positions, said unit including a casing which completely encloses and seals said apparatus to prevent entrance of water to the apparatus and having means for counteracting the hydrostatic pressures encountered in the body of water in which the device is working.

11. Apparatus for determining the topography of the bed of the ocean or other body of water, comprising a device and means for causing the device to travel along under water on the bed of said body of water, and means on said device operable under the water for indicating the successive positions of the device as it travels along on said bed, said last named means being a self-contained unit secured to the device and comprising apparatus including a pendulum operative under the influence of gravity to seek and remain in substantially a vertical position, said unit including a casing which completely encloses and seals said apparatus to prevent entrance of water to the apparatus and having means for counteracting the hydrostatic pressures encountered in the body of water in which the device is working.

12. Apparatus for determining the topography of the bed of the ocean or other body of water, comprising a device and means for causing the device to travel along under water on the bed of said body of water, and means on said device operable under the water for indicating the successive positions of the device as it travels along on said bed, said last named means being a self-contained unit secured to the device and comprising apparatus including a pendulum operative under the influence of gravity, and means for suspending the pendulum so that it remains in a vertical plane, irrespective of the position of said device, said unit including a casing which completely encloses and seals said apparatus to prevent entrance of water to the apparatus and having means for counteracting the hydrostatic pressures encountered in the body of water in which the device is working.

13. Apparatus for determining the topography of the bed of the ocean or other body of water, comprising a device and means for causing the device to travel along under water on the bed of said body of water, and means on said device operable under the water for indicating the successive positions of the device as it travels along on said bed, said last named means being a self-contained unit secured to the device and comprising apparatus including a pendulum operative under the influence of gravity and recording means controlled by the pendulum to record the movements of said device relative to the pendulum, said unit including a casing which completely encloses and seals said apparatus to prevent entrance of water to the apparatus and having means for counteracting the hydrostatic pressures encountered in the body of water in which the device is working.

14. Apparatus for determining the topography of the bed of the ocean or other body of water, comprising a device and means for causing the device to travel along under water on the bed of said body of water, and means on said device operable under the water for indicating the successive positions of the device as it travels along on said bed, said last named means being a self-contained unit secured to the device and comprising apparatus including a pendulum operative under the influence of gravity and recording means controlled by the pendulum to record the movements of said device relative to the pendulum, a casing enclosing said apparatus including the pendulum and recording means, and means for preventing the water from entering the casing comprising a gaseous medium under pressure in said casing.

15. Apparatus for determining the topography of the bed of the ocean or other body of water, comprising a device and means for causing the device to travel along under water on the bed of said body of water, said device having longitudinal and transverse axes, and self-contained means on said device operable under the water for indicating the successive angular positions of said axes with respect to the horizontal as the device travels along on the bed, said last named means comprising apparatus including two pendulums each operative under the influence of gravity to seek and remain in substantially a vertical position, one of said pendulums indicating the movements of said longitudinal axis relative to the horizontal and the other of said pendulums indicating the movements of said transverse axis relative to the horizontal, said means including casing structure which completely encloses and seals said apparatus to prevent entrance of water to the apparatus and having means for counteracting the hydrostatic pressures encountered in the body of water in which the device is working.

16. A submarine cable laying device having supporting means for engaging and traveling along on the bed of the body of water in which the cable is to lie, means for causing the device to travel along under water on said bed, means for simultaneously passing a cable through the device, and means operable under the water for indicating the successive angular positions assumed by said device as it travels along during the cable laying operation, said last named means being a self-contained unit secured to said device and having apparatus therein operable under the influence of gravity for indicating said angular positions, said unit including a casing which completely encloses and seals said apparatus to prevent entrance of water to the apparatus and having means for counteracting the hydrostatic pressures encountered in the body of water in which the device is working.

17. A submarine cable laying device having supporting means for engaging and traveling along on the bed of the body of water in which the cable is to lie, means for causing the device to travel along under water on said bed, means for simultaneously passing a cable through the device, and means on said device operable under the water for indicating the successive angular positions assumed by said device as it travels along during the cable laying operation, said last named means being a self-contained unit secured to said device and having apparatus therein operable under the influence of gravity for indicating said angular positions, said unit including a casing which completely encloses and seals said apparatus to prevent entrance of water to the apparatus and having means for counteracting the hydrostatic pressures encountered in the body of water in which the device is working.

18. A submarine cable laying device having supporting means for engaging and traveling along on the bed of the body of water in which the cable is to lie, means for causing the device to travel along under water on said bed, means for simultaneously passing a cable through the device, and means on said device operable under the water for indicating the successive angular positions assumed by the device during the cable laying operation, said last named means being a self-contained unit secured to the device and comprising apparatus including a pendulum operative under the influence of gravity and tending to seek and remain in substantially a vertical position, supporting structure including mounting means for the pendulum such that the pendulum may swing in one plane only relative to the supporting structure, and mounting means for said supporting structure such that the latter may freely swing in a plane substantially at right angles to the plane of the pendulum, the center of gravity of the supporting structure being sufficiently low relative to its mounting means to cause the supporting structure to seek and remain in a position such that the plane of the pendulum will remain substantially vertical, irrespective of the position of said cable laying device, said unit including a casing which completely encloses and seals said apparatus to prevent entrance of water to the apparatus and having means for counteracting the hydrostatic pressures encountered in the body of water in which the device is working.

19. A submarine cable laying device having supporting means for engaging and traveling along on the bed of the body of water in which the cable is to lie, means for causing the device to travel along under water on said bed, means for simultaneously passing a cable through the device, means comprising a self-contained unit secured to said device and having apparatus operable under the water and operative under the influence of gravity for indicating the successive angular positions assumed by the device as it travels along during the cable laying operation, and means for damping the operation of said indicating means to minimize jerks thereon, said unit including a casing which completely encloses and seals said apparatus to prevent entrance of water to the apparatus and having means for counteracting the hydrostatic pressures encountered in the body of water in which the device is working.

20. A submarine cable laying device having supporting means for engaging and traveling along on the bed of the body of water in which the cable is to lie, means for causing the device to travel along under water on said bed, means for simultaneously passing a cable through the device, means comprising a self-contained unit secured to said device and having apparatus operable under the water and operative under the influence of gravity for measuring the successive angles assumed by the device with respect to the horizontal as the device travels along during the cable laying operation, a chart and marking means operatively associated therewith, time controlled means for advancing the chart relative to the marking means, and means for controlling the marking means in accordance with the movements of said measuring means to produce a record on the chart of the successive angular positions assumed by the cable laying device, said unit including a casing which completely encloses and seals said apparatus to prevent entrance of water to the apparatus and having means for counteracting the hydrostatic pressures encountered in the body of water in which the device is working.

21. Submarine apparatus for determining the manner of operation of a submarine cable laying device which is caused to travel along on the bed of the body of water on which the cable is to lie and have the cable passed therethrough, said submarine apparatus comprising means secured to said cable laying device and operable under the water for indicating the successive angular positions assumed by said cable laying device as it travels along during the cable laying operation, said means being a self-contained unit and having apparatus therein operable under the influence of gravity for indicating said angular positions, said unit including a casing which completely encloses and seals said last named apparatus to prevent entrance of water to said apparatus and having means for counteracting the hydrostatic pressures encountered in the body of water in which the submarine apparatus is working.

CHESTER S. LAWTON.